Oct. 22, 1963 W. E. BAKER 3,107,808
FLUID PRESSURE RESPONSIVE INDICATING DEVICE
Filed April 9, 1962 2 Sheets-Sheet 1
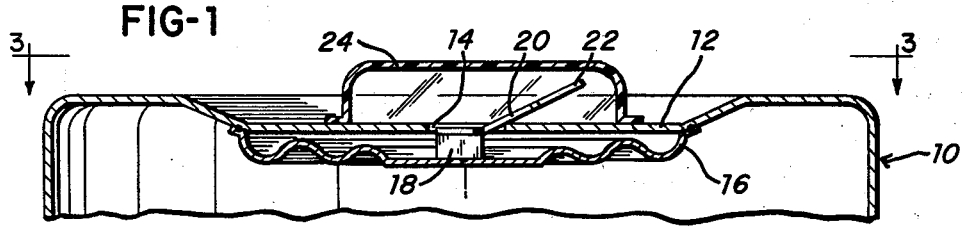
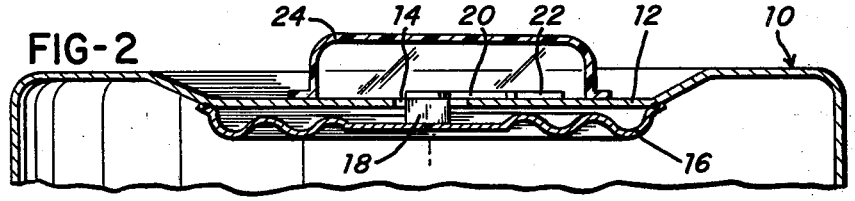
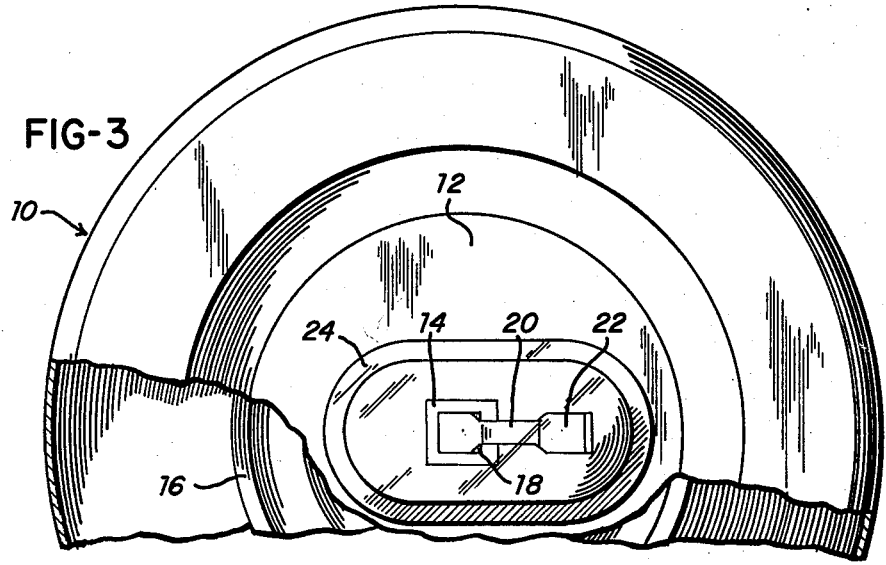
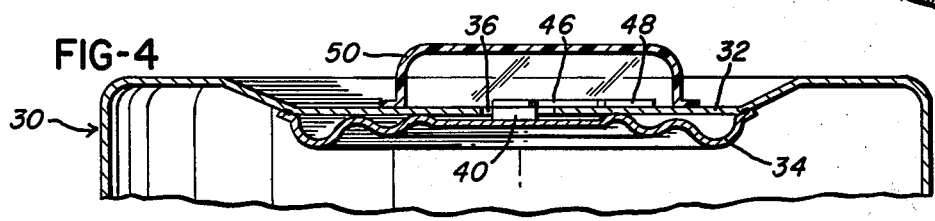
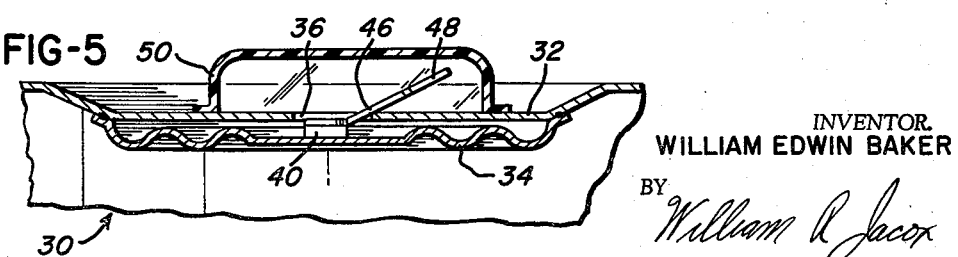
INVENTOR.
WILLIAM EDWIN BAKER
BY
ATTORNEY Oct. 22, 1963 W. E. BAKER 3,107,808
FLUID PRESSURE RESPONSIVE INDICATING DEVICE
Filed April 9, 1962 2 Sheets-Sheet 2
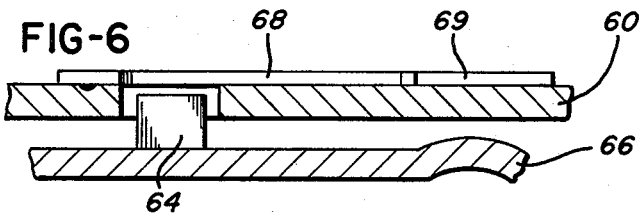
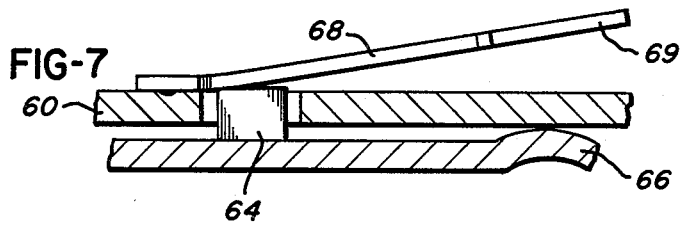
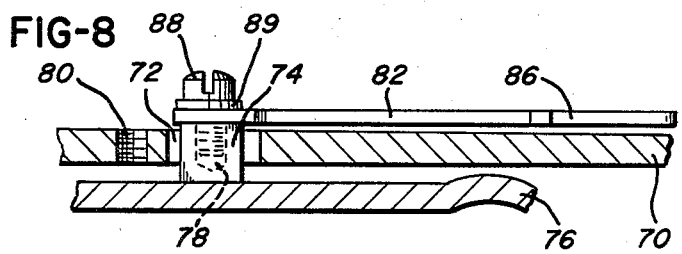
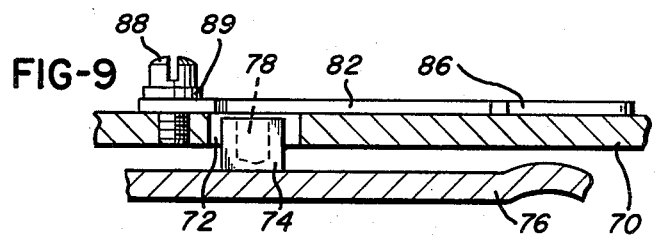
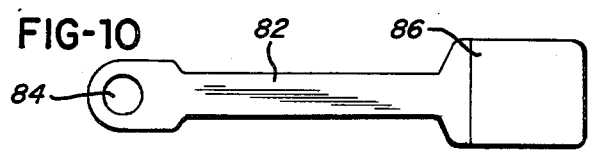
INVENTOR.
WILLIAM EDWIN BAKER
BY
ATTORNEY United States Patent Office 3,107,808
Patented Oct. 22, 1963

3,107,808
FLUID PRESSURE RESPONSIVE INDICATING DEVICE
William Edwin Baker, Needham, Mass., assignor to Standard-Thomson Corporation, Waltham, Mass., a corporation of Delaware
Filed Apr. 9, 1962, Ser. No. 186,119
8 Claims. (Cl. 220—44)

This invention relates to a pressure responsive device. The invention relates more particularly to a device for indicating changes in pressure within a container. The invention relates still more particularly to means for indicating loss of positive pressure or loss of negative pressure within a container.

Many types of products and goods are packaged in containers which are sealed with internal pressures less than, or greater than atmospheric. Of course, it is desirable to maintain such negative pressure or positive pressure within the container in order to protect the goods therewithin. However, various factors may cause the container to leak, so that the desired positive or negative pressure therewithin is lost. Usually such leaks are caused by very small openings in the container, too small to be readily observed, and the change in pressure caused thereby is unknown until the container is opened. At such time, the contents may be found to be damaged and in an unusable condition.

In my copending Application Serial No. 70,236, filed November 18, 1960, now Patent No. 3,094,239, I have set forth and claimed an invention directed to the same purposes as the present invention, but over which the invention of this application possesses certain improvements as will appear more fully hereinafter. This application is a continuation-in-part of said copending application.

It is a principal object of the present invention to provide relatively inexpensive means for indicating a loss of pressure or a loss of vacuum in a container.

It is a further object of this invention to provide such indicator means which, upon restoration of the container to said desired pressure or vacuum, reverts to its normal indication that the desired condition again exists.

It is a further object of this invention to provide means of the above nature which indicates loss of vacuum or loss of pressure, and in which loss of either of these conditions produces an indication readily observable.

It is a further object of this invention to provide such indicator structure which produces the same type of indication whether a desired vacuum or a desired pressure should fail.

It is a still further object of this invention to provide a device of the above nature which may, as desired, be altered from one to the other of a plurality of forms by the procedure of changing the position of a single operating member.

Other objects and advantages reside in the construction of parts, the combination thereof, the method of manufacture, and the mode of operation, as will become more apparent from the following description.

In the drawings:

FIGURE 1 is a fragmentary sectional view of a container provided with pressure indicator structure of this invention.

FIGURE 2 is a sectional view, similar to FIGURE 1, but showing the pressure indicator structure after a change in pressure within the container.

FIGURE 3 is a view taken substantially on line 3—3 of FIGURE 1 but with parts broken away.

FIGURE 4 is a fragmentary sectional view of a container showing a modification of pressure indicator structure of this invention.

FIGURE 5 is a sectional view, similar to FIGURE 4, but showing the pressure indicator structure after a change in pressure within the container.

FIGURE 6 is an enlarged fragmentary sectional view of a portion of an alternative form of the invention in one of its two operating positions.

FIGURE 7 is a view, similar to that of FIGURE 6, of the same form of the invention in the other of its two operating positions.

FIGURE 8 is an enlarged fragmentary sectional view of a further form of the invention, assembled for one of its two characteristic methods of operation.

FIGURE 9 is a view similar to FIGURE 8 in which the components of the structure of FIGURE 8 are assembled for the other of its two characteristic methods of operation.

FIGURE 10 is a plan view of a component part of the form of the invention shown in FIGURES 8 and 9.

Referring to the drawings in detail, FIGURE 1 shows a portion of a container 10 which has been sealed under negative pressure or vacuum. The container 10 is shown as including a bulkhead or wall portion 12 which is provided with an aperture 14. A diaphragm or flexible inner enclosing wall 16 has the peripheral portion thereof sealingly attached to the inner part of the bulkhead or wall portion 12 of the container 10.

The diaphragm or flexible enclosing wall 16 has a central protuberance or stud 18 which is movable through the aperture 14 of the wall 12 upon sufficient movement of the diaphragm 16 toward said wall 12.

Secured at one of its extremities to the protuberance 18, as by cementing or soldering or the like, and in cantilever relation thereto, is a resilient extended leaf or tongue-like member 20 having an extremity flag portion 22, as best seen in FIGURE 3. The extremity or flag portion 22 is formed, colored, or otherwise so that the flag portion 22 is distinctly and conspicuously visible from a considerable distance and the position thereof may be easily determined.

The positioning of the leaf 20 with respect to the diaphragm 16 is made such that with the diaphragm 16 in its outwardly deflected position, as indicated in FIGURE 2, the flag portion 22 lies flat upon or is disposed adjacent, the outer surface of the wall 12. With the diaphragm 16 in its inwardly deflected position, as shown in FIGURE 1, the intermediate portion thereof engages the wall 12 at the edge of the aperture 14. The engaged portion of the wall 12 thus serves as a fulcrum as the leaf 20 bendingly deflects thereabout and assumes the angularly deflected position shown in FIGURE 1.

A transparent cup-like cover member 24, formed of rigid transparent material, such as an acrylic resin or the like may be attached to the outer surface of the wall 12. The cover member 24 surrounds and protects the leaf 20 and its flag portion 22, leaving the leaf 20 free for movement through its deflecting range with the flag 22 visible in any operating position. It has been found desirable in some instances to provide hermetic sealing between the cover member 24 and the face of the bulkhead 12, whereby to isolate from the atmosphere the space enclosed by said cover member 24 and the diaphragm 16.

As hereinbefore stated, the form of the invention shown in FIGURES 1 and 2 is adapted for use with a container in which it is desired to maintain a substantial vacuum or pressure less than atmospheric. Under such condition, the parts of the invention are disposed as indicated in FIGURE 1; the diaphragm 16 is inwardly deflected, the protuberance or stud 18 is in a withdrawn position within the aperture 14 and the leaf 20 with its flag portion is in a raised position.

In the event of loss of vacuum or loss of negative pressure, the diaphragm 16, by virtue of its inherent resiliency, moves toward the wall 12, and the leaf 20 resiliently moves to its normal position lying substantially parallel to the outer surface of the bulkhead or wall 12.

The two positions of the flag 22 are readily distinguishable by viewing through the transparent cover 24, thus providing a positive indication of negative pressure, or loss of negative pressure within the container 10.

FIGURES 4 and 5 show a portion of a container 30 which is adapted to be sealed under positive pressure. The container 30 is shown as having a fixed wall portion 32, to which is sealingly attached on the inner surface thereof a flexible resilient diaphragm member or movable wall 34. Said wall portion 32 is provided with an aperture 36. The diaphragm 34 carries a protuberance or stud 40 which is movable through the aperture 36.

The resiliency of the diaphragm 34 tends to cause the diaphragm 34 to assume the position thereof shown in FIGURE 5. However, when the container 30 is sealed under positive internal pressure, the central portion of the diaphragm 34 is forced to move toward the wall portion 32, as shown in FIGURE 4. In such position of the diaphragm 34, the protuberance or stud 40 is disposed within the aperture 36 of the wall portion 32.

Secured to the protuberance 40, and movable therewith is a cantilever member or indicator member 46, substantially identical in its structure and its mounting to the leaf 20, shown in FIGURES 1, 2, and 3. The cantilever member 46 has a distinctly marked flag or signal portion 48 whereby the deflected position of said cantilever member 46 is readily ascertained from a considerable distance. The positioning of the cantilever member 46 with respect to the diaphragm member 34 is made such that with the diaphragm 34 in its outwardly deflected position, as indicated in FIGURE 4, the flag portion 48 of the cantilever 46 lies flat upon or is disposed adjacent the outer surface of the wall portion 32.

With the diaphragm 34 in its inwardly deflected position, as indicated in FIGURE 5, the flag 48 engages the surface of the wall portion 32 at the edge of the aperture 36, making a fulcrum of the wall portion 32, and rotating thereabout through a limited angle to assume the position indicated in FIGURE 5.

A transparent cover member 50, identical in all respects to the cover member 24 shown in FIGURES 1, 2, and 3, may be attached to the outer surface of the wall portion 32, thus protecting the cantilever member 46 without interfering with the visibility of the flag portion 48.

FIGURES 6 and 7 show a modification of the invention in which a cantilever member or leaf 68, with its flag portion 69 is secured to a fixed wall 60 of a pressure vessel. The cantilever member 68 is subject to actuation by engagement with an abutment portion 64 of a resilient diaphragm or movable wall 66 which is adjacent the fixed wall 60.

FIGURE 6 shows the elements of the invention in their respective positions when the pressure vessel, of which the wall 60 is a part, is under vacuum or negative pressure.

If there is a loss of negative pressure, the natural resiliency of the diaphragm 66 causes movement thereof toward the wall 60. When this movement occurs, the abutment portion 64 of the diaphragm 66 engages the cantilever member 68 and forces movement thereof in a direction away from the fixed wall 60. Thus, when the position of the flag 69 is as shown in FIGURE 7, the desired vacuum or negative pressure within the container no longer exists. This fact is readily determinable due to the fact that the difference in position of the flag 69 as shown in FIGURE 6 is readily distinguished from the position thereof as shown in FIGURE 7.

The position of the flag 69 is as shown in FIGURE 7 when the pressure vessel is subjected to a pressure greater than atmospheric. When there is a loss of such positive pressure, the flag 69 is positioned as shown in FIGURE 6.

FIGURES 8, 9, and 10 show a modification of the invention, which may be adapted to any of the forms previously shown. The numeral 70 designates a fixed wall portion of a container wherein it is desired to maintain a non-atmospheric pressure and to obtain an indication of a departure therefrom. Formed in the wall portion 70 is an aperture 72. A stud or abutment 74 carried by a movable resilient diaphragm or wall member 76, shown only in part, projects into the aperture 72, and with deflection of the diaphragm 76, the abutment 74 has therein limited movement in a direction substantially normal to the surface of the wall 70. As in the previously described embodiments, the diaphragm member 76 is hermetically sealed to the lower (inner) face of the fixed wall 70, providing between the diaphragm 76 and the wall 70 a space at substantially atmospheric pressure. Formed in the stud or abutment 74 is a tapped opening 78, a similar opening 80 is formed in the wall 70 immediately adjacent the aperture 72.

A tongue-like extended resilient cantilever member or leaf 82 has formed therein, near one extremity thereof, an opening 84, as shown in FIGURE 10. At the extremity of the leaf 82 remote from the opening 84, the leaf 82 has a flag portion 86 which is formed, colored, or otherwise provided with a conspicuously visible surface, whereby the flag portion 86 may be distinctly visible from a considerable distance and its position noted.

In the form of the invention shown in FIGURE 8, the flag member 82 is secured at its perforated extremity to the stud 74 by means of a screw or equivalent fastening member 88 which passes through the opening 84. The fastening member 88 is threaded into the tapped opening 78, and is preferably supplemented by a washer 89 to provide greater security of fastening. With this assembly, and with the diaphragm 76 in its outwardly deflected position, as indicated in FIGURE 8, the flag 86 lies close to, and substantially parallel with, the wall 70. This is the position of the components when there is pressure greater than atmospheric within the container of which the wall 70 is a part.

On the other hand, when there is loss of such positive pressure, the diaphragm 76 moves to a position farther from the wall 70. With the diaphragm 76 in such inwardly deflected position, the leaf 82, intermediate its fixed and free extremities, engages the surface of the wall portion 70 at its edge adjacent the aperture 72, and is deflected sharply outward about its mounting on the stud 74. This deflected position is not shown in the drawings, as it represents a performance which is similar to that illustrated by FIGURE 5.

In the form of the invention shown in FIGURE 9, the leaf 82 is transferred from the location shown in FIGURE 8, and is secured to the surface of the wall portion 70 by means of the fastening member 88 as it passes through the opening 84 and threadedly engages the tapped opening 80. Thus, there is provided an assembly which may be operatively similar to that illustrated by FIGURE 7, wherein, in contradistinction to the form of FIGURE 8, an outward displacement of the diaphragm 76 causes the leaf 82 to be projected upwardly, while with an inward positioning of the diaphragm 76, the flag 86 lies adjacent the wall portion 70.

Thus, as shown in FIGURES 8 and 9, there is provided pressure responsive indicator means wherein by specific assembly of a single set of component parts there is obtained either of two distinct and characteristic operating performances.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:
1. In combination with a container,
pressure change indicator means including a resilient diaphragm having a movable portion forming a part of the container,
a flag pivotally attached to the movable portion of the diaphragm,
and abutment means carried by the container and engageable by the flag causing pivotal movement thereof as the flag is moved by said movable portion of the diaphragm.

2. In combination with a container, pressure change indicator means comprising:
a stationary member,
a resiliently movable enclosure member forming a part of the container,
means connecting the resiliently movable enclosure member to the stationary member,
an indicator movably attached to one of the members,
abutment means carried by the other of said members,
there being engagement between the indicator and the abutment means as the resilient enclosure member moves with respect to the stationary member, such engagement causing movement of the indicator.

3. In combination with a container, the container having a rigid wall member provided with an aperture therethrough,
pressure change indicator means including:
a flexible movable wall member connected to the container and having a peripheral edge sealingly encompassing the aperture of the rigid wall member,
said wall members being in adjacent relationship,
an indicating member mounted as a cantilever on one of said wall members and engageable with the other wall member upon relative movement between said members in response to a pressure change within said container.

4. For a container adapted to be maintained fluid tight in which a portion of the container has a flexible resilient enclosing wall provided with a movable section, pressure change indicator apparatus including:
stationary abutment means carried by the container,
indicator means carried by the movable section of the flexible resilient wall and disposed adjacent the stationary abutment means,
the indicator means having a flag portion movable with respect to the flexible resilient enclosing wall,
the indicator means being engageable with the stationary abutment means upon movement of said movable section of the flexible resilient wall, said engagement between the indicator means and the abutment means causing movement of the flag portion of the indicator means with respect to the flexible resilient enclosing wall.

5. Container apparatus comprising:
fixed wall means,
movable wall means adjacent the fixed wall means,
means joining the fixed wall means to the movable wall means,
an indicator carried by one of said wall means, the other wall means being provided with an engagement portion,
there being engagement between the engagement portion of said wall means and the indicator carried by the other wall means as the movable wall means moves with respect to the fixed wall means,
the indicator being movable with respect to the wall means which carries the indicator as engagement occurs between the engagement portion of said wall means and the indicator which is carried by the other of said wall means.

6. In container apparatus,
an enclosure having a movable wall member,
a fixed member carried by the enclosure adjacent the movable wall member,
an indicator attachable to either one of said members for support thereof, the indicator having a portion movable with respect to its supporting member,
the indicator being engageable with the other of said members upon movement of the movable wall member with respect to the fixed member,
said portion of the indicator being moved with respect to its supporting member as the indicator engages the other of said members.

7. Container apparatus comprising:
a fixed wall provided with an opening therethrough,
a movable wall carried by the rigid wall in adjacent relationship thereto,
the movable wall having a protuberance movable within the opening of the fixed wall upon movement of the movable wall toward the fixed wall,
an indicator carried by the protuberance and engageable with the fixed wall when there is a predetermined amount of movement of the movable wall with respect to the fixed wall,
the indicator having a portion movable with respect to the movable wall when there is engagement between the indicator and the fixed wall.

8. Container apparatus comprising:
a movable wall,
fixed support structure adjacent the movable wall,
means joining the fixed support structure to the movable wall,
an indicator carried by the fixed support structure,
the movable wall having an abutment portion engageable with the indicator when there is a given amount of movement of the movable wall toward the fixed support structure,
the indicator having a portion thereof movable with respect to the fixed support structure when the indicator is engaged by the abutment portion of the movable wall.

References Cited in the file of this patent

UNITED STATES PATENTS

| | | |
|---|---|---|
| 2,395,588 | Shoner | Feb. 26, 1946 |
| 2,445,176 | Hoffman | July 13, 1948 |